UNITED STATES PATENT OFFICE.

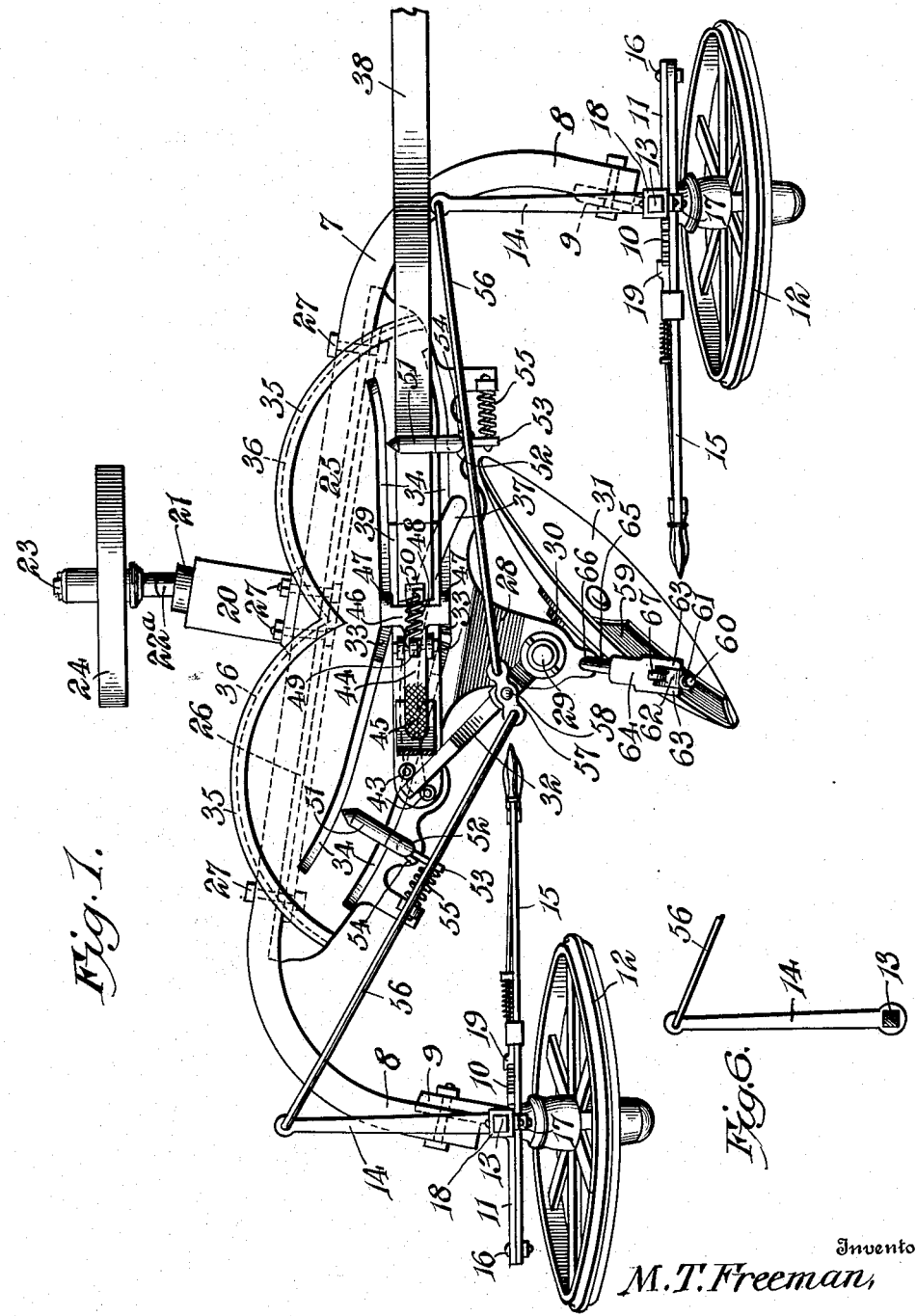

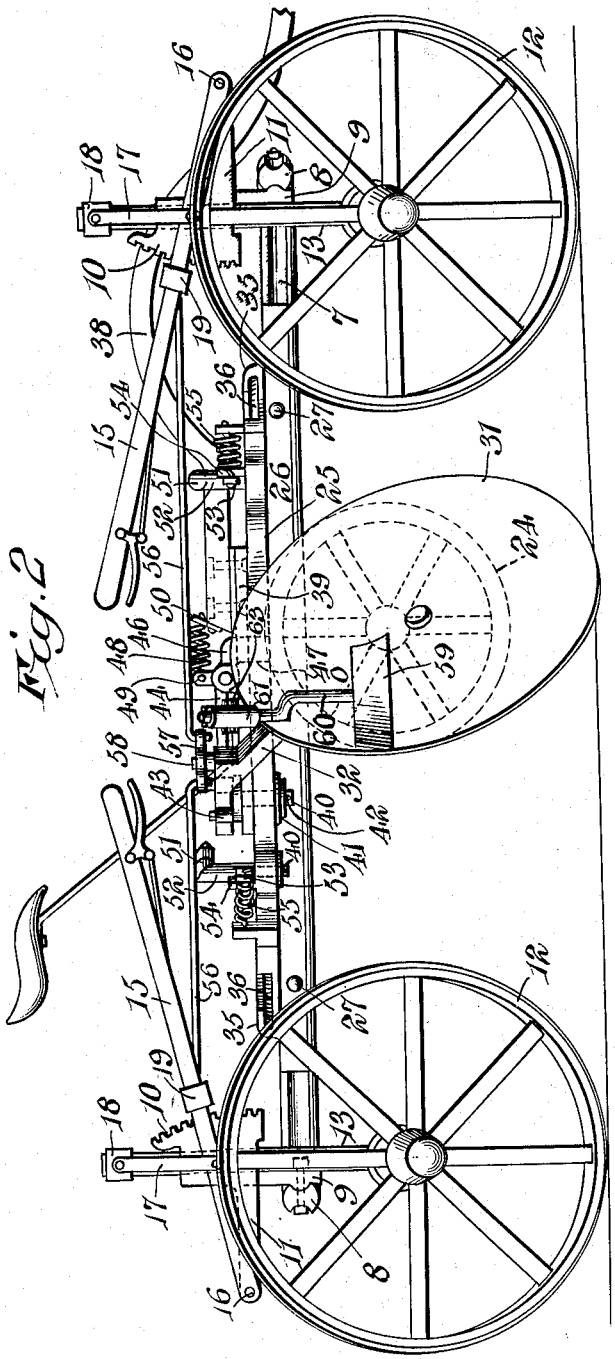

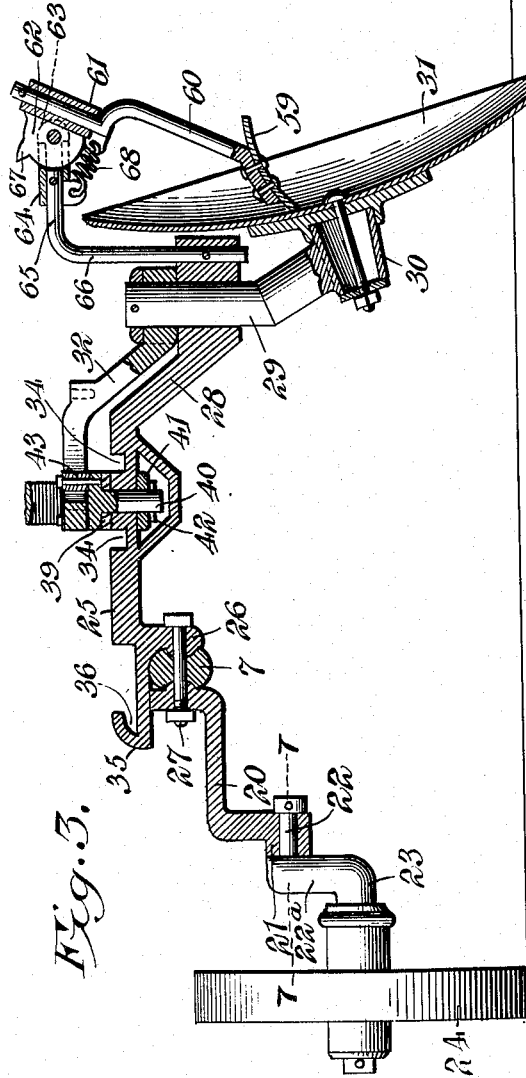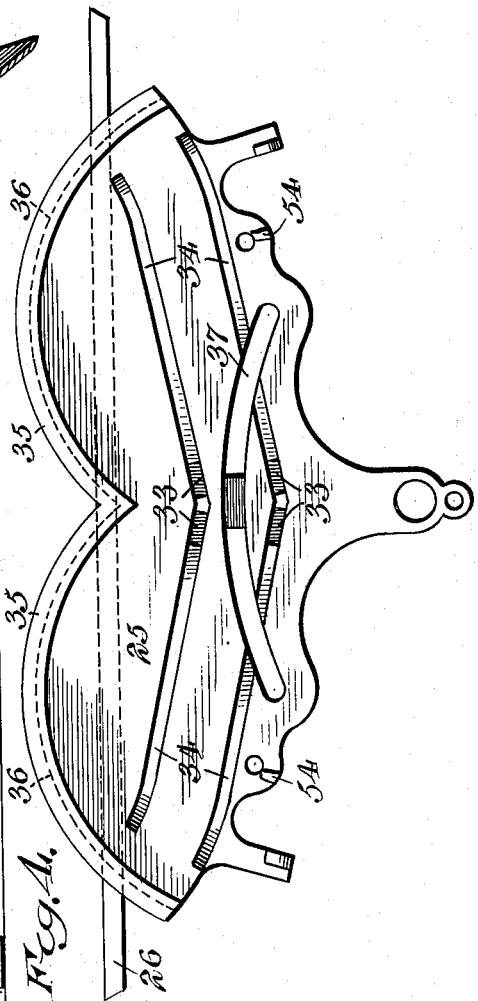

MILTON T. FREEMAN, OF CHATTANOOGA, TENNESSEE.

REVERSIBLE DISK PLOW.

No. 918,841.　　　　Specification of Letters Patent.　　　　Patented April 20, 1909.

Application filed November 30, 1908. Serial No. 465,302.

*To all whom it may concern:*

Be it known that I, MILTON T. FREEMAN, a citizen of the United States, residing at Chattanooga, in the county of Hamilton and State of Tennessee, have invented certain new and useful Improvements in Reversible Disk Plows, of which the following is a specification.

The present invention relates to disk plows of the reversible type, and more particularly to tha class in which the disk is automatically reversed by the draft animals, though there are features that are not necessarily limited to that specific type.

The primary object is to provide a novel and simple structure that is comparatively inexpensive to manufacture, has few wearing parts, and is so arranged that the plowing disk is quickly reversed without lateral strain upon the draft member.

Another object is to provide simple mechanism whereby the plowing disk, the scraper therefor, and the furrow wheels are simultaneously reversed.
The preferred form of construction is illustrated in the accompanying drawings, wherein:—

Figure 1 is a plan view of the plow. Fig. 2 is a side elevation of the same. Fig. 3 is a cross sectional view. Fig. 4 is a plan view of the bed plate. Fig. 5 is a longitudinal sectional view through the rear portion of the draft member. Fig. 6 is a detail sectional view illustrating the manner of connecting the crank arms with the shanks of the furrow wheel axles. Fig. 7 is a detail horizontal sectional view on the line 7—7 of Fig. 3.

Similar reference numerals designate corresponding parts in all the figures of the drawings.

In the embodiment disclosed, a beam 7 is employed, preferably of a single piece having offset terminals 8, to which are secured brackets 9 having racks 10 and outwardly extending arms 11. The usual furrow wheels 12 are employed that are journaled on axles having upstanding shanks 13, on which the said brackets 9 are slightly mounted. Portions of these axles are squared or angular in cross section, and on said portions are slidably mounted crank arms 14. Levers 15, fulcrumed, as shown at 16 upon the arms 11 of the brackets, have link connections 17 with collars 18 that are fastened to the upper ends of the shanks 13. These levers are provided with suitable locking dogs 19 that engage the racks 10. It will thus be evident that by operating the levers 15 the beam 8 can be raised and lowered, as desired upon the shanks 13. Secured to the central portion of the beam 7, as shown more particularly in Figs. 1 and 3 is another bracket 20 having at its outer end a horizontal journal box 21 in which is rotatably mounted a horizontal shank 22 having an offset crank arm 22ª that carries at its lower end an axle 23. On the axle a ground or landside wheel 24 is rotatably mounted. This axle 23 has a limited swinging movement, as will be clear by reference to Fig. 7, and furthermore it can be rotated so that the axle 23 can be disposed in different horizontal relations, any suitable means being employed for so holding it. This arrangement is peculiarly advantageous as it permits the plow being maintained nearer a level position on hillside land.

A bed plate 25 overlies the central portion of the beam 7, and has a depending flange 26 bolted, thereto, as shown at 27, certain of these bolts also constituting means for securing the bracket 20 to the beam, as illustrated in Fig. 3. This bed plate includes a downwardly inclined outer arm 28 formed at its ends into a box in which is journaled the upright shaft 29 of a plow-carrying member. The lower end of this shaft is provided with the usual box 30, in which is journaled a reversible plowing-disk 31. The upper portion of said shaft carries a crank arm 32 that operates over the main portion of the bed plate 25. This bed plate is provided with two sets of depressions 33 forming latch-receiving seats, and extending in opposite directions from said depressions, are grooves 34 of less depth than the same, said grooves terminating short of the ends of the plate and forming guideways, as hereinafter explained. The rear edges of the said plate are provided with upstanding curved flanges 35 overhanging, as shown in Fig. 3, to produce curved grooves 36. In addition to the above features, the said bed plate has a curved slot 37 that intersects the outer set of grooves 34, as will be clear by reference to Figs. 1 and 4.

A draft member is employed, which is in the form of a beam 38 secured at its rear end to a bar section 39 that operates over the bed plate 25. A pivot element, comprising a stem 40, is journaled in the rear end of the draft member, and operates in the slot 37, as illustrated in Figs. 3 and 4, being held against displacement by a washer 41 located on the stem below the plate 25, which washer is held in place by a suitable pin 42 or other securing device. The upper end of this element has journaled thereon a pair of rollers 43, which, as clearly shown in Fig. 1, embrace and are slidable along the crank arm 32. A latch 44 is pivoted between its ends upon the draft member, and has a rearwardly extending foot-piece 45. The front end of this latch is forked, as shown at 46, and has depending portions 47 that embrace the beam, said portions engaging in the seats 33, being slidable in the grooves 34, and also engaging the curved guideways or flanges 35, as hereinafter explained. The terminal portions 47 are urged downwardly by a spring 48 connected to an upstanding ear 49 on the latch and to an upstanding ear 50 secured to the draft member.

In order to hold the draft member against rising when in its reversed positions, pointed fingers 51 are employed that are pivotally mounted, as shown at 52, and extend over the beam 38. These fingers have rearwardly extending ears 53 abutting against stops 54 and secured to springs 55 that serve to hold them in their outstanding relation transversely of the beam.

As already explained, the upstanding shanks 13 are slidable through the crank arms 14. In order to effect the necessary change in the furrow wheels with respect to the beam when the plow is reversed, these crank arms 14 have link connections 56 with a plate 57 pivoted between its ends, as shown at 58 in Fig. 1, to the crank arm 32. These connections, however, do not interfere with the vertical adjustment of the plow frame with respect to the furrow wheels.

Coöperating with the plowing-disk 31 is the necessary scraper 59 that is secured to a shank 60. The upper end of this shank is offset, and journaled in a box 61 having an ear 62 journaled to and between a pair of ears 63 forming part of another box 64. The box 64 is fixed to the outstanding arm 65 of a standard 66 secured to the box of the plow-carrying shaft 29, as shown fully in Fig. 3. The movement of the scraper 59 away from the disk 31 is limited by a lug 67 which abuts against the box 64. The said scraper is yieldingly held in engagement with the front face of the disk by a spring 68 secured at one end to the box 61 and at the other end to the overhanging arm 65 of the standard 66.

The operation of the structure is substantially as follows. Assuming the draft member secured in the position shown in Fig. 1, it will be evident that it can neither swing nor move longitudinally upon the bed plate, because of the latch which is engaged in the foremost set of seats 33. When the end of a furrow is reached, the operator seated upon the machine, presses downwardly upon the portion 45 of the latch. As a result, said latch is disengaged from the seats, and as the team moves forward, the beam or draft member will be moved longitudinally. It cannot, however, swing as long as the latch is engaged in the guideways 34. Upon the forward movement, the pivot stem 40 rides in the slot 37, and simultaneously it will be evident that the crank arm 32 will be swung, thus reversing the disk, the scraper and the furrow wheels. When the said latch moves beyond the grooves or guideways 34, it becomes engaged in the guideway 35, which prevents any further longitudinal movement, but permits the reversing movement to now take place. As the beam swings around the pivot stem 40 will remain at the opposite end of the slot 37. Consequently when the beam swings beneath the pin 51, the latch will drop into the other set of seats 33, the plow will now be reversed, and ready for movement in the opposite direction. It will thus be seen that in this particular construction, the reversal of the disk is accomplished upon the longitudinal movement of the beam or draft member prior to the reversal of said draft member. There is consequently practically no lateral resistance to the swinging movement of the draft member during the reversing movement as the plowing member and all the associated parts have been already reversed. Moreover the movements of the draft member with respect to the bed or support is governed wholly by the latch 44, which in the first instance, prevents any movement of said draft member, secondly insures the longitudinal movement of the draft member prior to its reverse, and thirdly guides said draft member during its swinging or reversing movement.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a reversible plow, the combination with a reversible plowing member, of a reversible and longitudinally movable draft member, and means connected to the draft member for effecting the reversal of the plowing member on the longitudinal movement and prior to the reversal of the draft member.

2. In a reversible plow, the combination with a reversible plowing member, of a reversible draft member, and means operated by the draft member for effecting the reversal of the plowing member prior to the reversal of the draft member.

3. In a reversible plow, the combination with a support, of a plowing member carried thereby, a reversible draft member having a substantially longitudinal movement on the support, and means for preventing the reversing movement of the draft member prior to its longitudinal movement.

4. In a reversible plow, the combination with a support, of a plowing member carried thereby, a reversible draft member having a substantially longitudinal movement on the support, and means for securing the draft member against longitudinal movement on the support.

5. In a reversible plow, the combination with a support, of a plowing member carried thereby, a reversible draft member having a substantially longitudinal movement on the support, and means for securing the draft member against longitudinal and reversing movement on the support.

6. In a reversible plow, the combination with a support, of a plowing member carried thereby, a reversible draft member having a substantially longitudinal movement on the support, and a single locking device for securing the draft member both against longitudinal and reversing movement.

7. In a reversible plow, the combination with a support, of a reversible draft member having a sliding and pivotal connection with the support, and a locking device mounted on the draft member and engaging the support in the reversed positions of the draft member to secure said member against sliding and pivotal movements in opposite directions.

8. In a reversible plow, the combination with a reversible plowing member, of a reversible draft member capable of longitudinal movement, means for effecting the reversal of the plowing member on the longitudinal movement of the draft member, and means for holding the draft member against longitudinal movement.

9. In a reversible plow, the combination with a reversible plowing member, of a reversible draft member capable of longitudinal movement, and means for insuring the longitudinal movement of the draft member prior to its reversal.

10. In a reversible plow, the combination with a reversible plowing member, of a reversible draft member capable of longitudinal movement, means for insuring the longitudinal movement of the draft member prior to its reversal, and means for effecting the reversal of the plowing member on the longitudinal movement of the draft member.

11. In a reversible plow, the combination with a reversible plowing member, of a reversible draft member capable of substantially longitudinal movement, and guideways for insuring the longitudinal movement of the draft member prior to its reversal.

12. In a reversible plow, the combination with a reversible plowing member, of a reversible draft member capable of substantially longitudinal movement, a guideway, and a locking device for the draft member carried thereby and engaging in the guideway to insure said longitudinal movements prior to the reversal of the draft member.

13. In a reversible plow, the combination with a support, of a reversible plowing member mounted thereon, a reversible draft member capable of longitudinal movement on the support, means for reversing the plowing member upon the longitudinal movement of the draft member, and means for locking the draft member against longitudinal movement and in its reversed positions.

14. In a reversible plow, the combination with a support, of a reversible plowing member mounted thereon, a reversible draft member capable of longitudinal movement on the support, means for reversing the plowing member upon the longitudinal movement of the draft member, and a common lock for securing the draft member against longitudinal movement in both of its reversed positions.

15. In a reversible plow, the combination with a support, of a reversible plowing member mounted thereon, a reversible draft member capable of longitudinal movement on the support, means for reversing the plowing member upon the longitudinal movement of the draft member, and means for locking the draft member against longitudinal movement and in its reversed positions, said means also insuring the longitudinal movement of the draft member prior to its reversal.

16. In a reversible plow, the combination with a support, of a reversible plowing member mounted thereon, a reversible draft member capable of longitudinal movement on the support, means for reversing the plowing member upon the longitudinal movement of the draft member, and a common lock for securing the draft member against longitudinal movement in both of its reversed positions, said lock also constituting means for insuring the longitudinal movement of the draft member prior to its reversal.

17. In a reversible plow, the combination with a bed having guideways, and a latch-receiving seat, of a reversible plowing member mounted on the bed, a draft member slidably and swingingly associated with the bed, a latch carried by the draft member, said latch engaging in the seat and in the guideways for governing the movement of said draft member, and a reversing connection between the plowing and draft members.

18. In a reversible plow, the combination with a beam, of a bed plate secured thereto, said plate having central latch-receiving seats and guideways extending in opposite directions therefrom, of a reversible plowing member journaled in the bed plate, a draft member slidably and swingingly engaged with the bed plate, a latch carried by the draft member, said latch engaging in the seat and guideways for governing the movement of the draft member, and a crank connection between the draft member and the plowing member.

19. In a reversible plow, the combination with a plowing member, of a reversible draft member capable of longitudinal movement, means for insuring its longitudinal movement prior to its reversal, and means for limiting its longitudinal movement and permitting its said reversal.

20. In a reversible plow, the combination with a plowing member, of a reversible draft member capable of longitudinal movement, means for locking the draft member against longitudinal movement and for insuring its longitudinal movement prior to its reversal, when released, and means for limiting the longitudinal movement of the draft member and permitting its reversal.

21. In a reversible plow, the combination with a plowing member, of a reversible draft member capable of longitudinal movement, a lock for holding the draft member against longitudinal movement, said lock constituting means for insuring the longitudinal movement of the draft member prior to its reversal, and means for limiting the longitudinal movement of said draft member and permitting its reversal.

22. In a reversible plow, the combination with a plowing member, of a reversible draft member capable of longitudinal movement, means for insuring said longitudinal movement prior to its reversing movement, and means for guiding the draft member in its reversing movement.

23. In a reversible plow, the combination with a plowing member, of a reversible draft member having a longitudinal movement, means for insuring the longitudinal movement of the draft member prior to its reversing movement, a curved guideway, and means carried by the draft member and detachably engaging in the guideway to govern the reversing movement of said draft member.

24. In a reversible plow, the combination with a plowing member, of a reversible draft member having a longitudinal movement, means for insuring the longitudinal movement of the draft member prior to its reversing movement, a curved guideway, and a locking device for holding the draft member, said device detachably engaging in the guideway to govern the reversing movement.

25. In a reversible plow, the combination with a bed having guideways, latch receiving seats and upstanding curved guide flanges, of a reversible plowing member, a longitudinally movable and swinging draft member, and a latch mounted on the member, said latch engaging in the seats to hold the draft member against longitudinal movement, operating in the guideways when released from the seats to permit said longitudinal movement, and engaging the flanges to limit the longitudinal movement and direct the draft member in its reversing movements.

26. In a reversible plow, the combination with a bed having guideways, latch-receiving seats and upstanding curved guide flanges, of a reversible plowing member, a longitudinally movable and swinging draft member, a latch mounted on the member, said latch engaging in the seats to hold the draft member against longitudinal movement, operating in the guideways when released from the seats to permit said longitudinal movement and engaging the flanges to limit the longitudinal movement and direct the draft member in its reversing movements, and a connection between the plowing member and the draft member to effect the reversal of the former on the movement of the latter.

27. In a reversible plow, the combination with a plowing member, of a reversible draft member capable of longitudinal movement, a lock for normally holding the draft member, and means located in the path of movement of the lock to limit the longitudinal movement of the draft member.

28. In a reversible plow, the combination with a beam, of a bed plate secured thereto, a reversible plow-carrying member journaled on the bed plate and having a crank arm, said bed plate having central latch-receiving seats, oppositely extending guideways and curved upstanding guide flanges, a draft beam having a pivotal and longitudinal sliding movement on the bed plate, a connection between the beam and the crank, and a latch pivoted on the beam, said latch engaging in the seats to hold the beam and when disengaged from the seats, being movable in the guideways and engaging the guide flanges.

29. In a reversible plow, the combination with a reversible plowing member, of a crank arm connected thereto, and a reversible draft member capable of longitudinal movement and having a slidable connection with the crank arm.

30. In a reversible plow, the combination with a plow-carrying shaft having a crank arm, of a longitudinally movable draft member having a slidable connection with the crank arm.

31. In a reversible plow, the combination with a reversible plowing member having a crank arm, of a reversible draft member, and a bearing element journaled in the draft member and having a slidable engagement with the crank arm.

32. In a reversible plow, the combination with a reversible plowing member having a crank arm, of a reversible draft member, and a bearing element journaled in the draft member and having rollers that embrace and are slidable along the crank arm.

33. In a reversible plow, the combination with a plow-carrying shaft having a crank arm, of a longitudinally movable and reversible draft member, and a bearing element journaled in the draft member and having spaced upstanding rollers that embrace and are slidable upon the crank arm.

34. In a reversible plow, the combination with a support, of a swinging and longitudinally movable draft member, and a pivot upon which the draft member reverses, said pivot being slidable upon the support.

35. In a reversible plow, the combination with a support having a slot, of a swinging and longitudinally movable draft member, and a pivot upon which the draft member reverses, said pivot being slidable in the slot.

36. In a reversible plow, the combination with a support, of a reversible plowing member having a crank arm, a longitudinally movable and reversible draft member, and a pivot element for the draft member slidably engaged with the support and having a connection with the crank arm.

37. In a reversible plow, the combination with a support having a slot, of a reversible plowing member having a crank arm, a longitudinally movable and reversible draft member, and a pivot element for the draft member slidably engaged in the slot and having a slidable engagement with the crank arm.

38. In a reversible plow, the combination with a support, of a reversible plowing member, a reversible and longitudinally movable draft member, a pivot element for the draft member carried thereby and slidably engaging the support, connections between the draft member and plowing member, and means for insuring the longitudinal movement of the draft member prior to its reversal.

39. In a reversible plow, the combination with a support having a slot and a latch-receiving seat, of a reversible plowing member journaled on the support and having a crank arm, a swingingly and longitudinally movable draft member connected to the arm, a pivot for the draft member operating in the slot, and a latch carried by the draft member and engaging the seat.

40. In a reversible plow, the combination with a beam, of a bed plate secured thereto and having upstanding curved guide flanges, central latch-receiving seats, oppositely extending guideways and a curved slot, a plow-carrying shaft journaled in the bed plate and having a crank arm, a longitudinally movable and reversible draft beam, a pivot element journaled in the draft beam and having one portion engaging in the slot, rollers carried by the pivot element and embracing the crank arm, and a spring-pressed latch pivotally mounted on the beam, said latch engaging in the seats to hold the beam, moving in the guideways when disengaged from the seats and engaging the flanges during the reversal of the beam.

41. In a reversible plow, the combination with a supporting frame, of a swinging reversible draft member mounted thereon, devices movably located at the limits of the swinging movement of the draft member and engaging thereover to prevent the same raising from the support, and means for yieldingly maintaining said devices transversely of the draft member.

42. In a reversible plow, the combination with a support, of a swinging reversible draft member mounted thereon, pivotally mounted fingers located at the limits of the swinging path of the draft member and engaging over said draft member, and springs connected to the fingers and maintaining the same transversely of the draft member.

43. In a reversible plow, the combination with a support, of a reversible plowing disk mounted thereon, an arm overhanging the disk, a journal box pivoted on the arm and having a stop lug that engages said arm to limit its pivotal movement, a spring connection between the arm and box for moving the stop lug away from the arm, a shank having an offset end journaled in the box, and a scraper carried by the shank and coöperating with the front face of the disk.

In testimony whereof I affix my signature, in presence of two witnesses.

MILTON T. FREEMAN.

Witnesses:
J. ALLEN HEAD,
J. M. LANIER.